(12) United States Patent
Oshima et al.

(10) Patent No.: US 10,589,498 B2
(45) Date of Patent: Mar. 17, 2020

(54) DECORATIVE SHEET AND DECORATIVE PLATE

(71) Applicant: TOPPAN PRINTING CO., LTD., Tokyo (JP)

(72) Inventors: Nonoka Oshima, Tokyo (JP); Hajime Harima, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 0 days.

(21) Appl. No.: 16/355,733

(22) Filed: Mar. 16, 2019

(65) Prior Publication Data

US 2019/0210343 A1    Jul. 11, 2019

Related U.S. Application Data

(63) Continuation of application No. PCT/JP2017/040627, filed on Nov. 10, 2017.

(30) Foreign Application Priority Data

Nov. 15, 2016    (JP) .................................. 2016-222560

(51) Int. Cl.
*B32B 33/00*    (2006.01)
*B32B 7/12*    (2006.01)
(Continued)

(52) U.S. Cl.
CPC ............... *B32B 33/00* (2013.01); *B32B 7/12* (2013.01); *B32B 27/00* (2013.01); *B32B 27/10* (2013.01);
(Continued)

(58) Field of Classification Search
CPC ......... B32B 33/00; B32B 27/00; B32B 27/40; B32B 27/20; B32B 27/10; B32B 27/38;
(Continued)

(56) References Cited

U.S. PATENT DOCUMENTS 4,148,955 A * 4/1979 Breitenfellner ......... B29C 70/64
428/143
5,034,272 A    7/1991 Lindgren et al.
(Continued)

FOREIGN PATENT DOCUMENTS

EP    3 053 739 A    8/2016
JP    2000-158591 A    6/2000
(Continued)

OTHER PUBLICATIONS

[NPL-1] Yagishita (JP 2003-266611 A); (EPO machine translation to English). (Year: 2003).*

(Continued)

*Primary Examiner* — David Sample
*Assistant Examiner* — Donald M Flores, Jr.
(74) *Attorney, Agent, or Firm* — Foley & Lardner LLP

(57) ABSTRACT

A decorative sheet includes a substrate and a surface protective layer formed on the substrate. A decorative plate is formed by laminating the decorative sheet on a base. The surface protective layer includes a first surface protective layer formed on the substrate and a second surface protective layer formed on part of the first surface protective layer. The first surface protective layer contains a curable resin and has a surface kinetic friction coefficient of 0.11 or more and 0.30 or less. The second surface protective layer contains at least one of resin beads and an inorganic compound filler. The first surface protective layer is glossier than the second surface protective layer.

21 Claims, 2 Drawing Sheets

(51) Int. Cl.
| | |
|---|---|
| *B32B 29/00* | (2006.01) |
| *B32B 27/38* | (2006.01) |
| *B32B 27/20* | (2006.01) |
| *B32B 27/40* | (2006.01) |
| *B32B 27/10* | (2006.01) |
| *B32B 27/00* | (2006.01) |

(52) U.S. Cl.
CPC .............. *B32B 27/20* (2013.01); *B32B 27/38* (2013.01); *B32B 27/40* (2013.01); *B32B 29/002* (2013.01); *B32B 2255/10* (2013.01); *B32B 2255/12* (2013.01); *B32B 2318/04* (2013.01); *B32B 2363/00* (2013.01); *B32B 2451/00* (2013.01); *B32B 2475/00* (2013.01); *B32B 2479/00* (2013.01); *Y10T 428/24* (2015.01)

(58) Field of Classification Search
CPC ..... B32B 29/002; B32B 7/12; B32B 2255/10; B32B 2318/04; B32B 2363/00; B32B 2451/00; B32B 2255/12; B32B 2479/00; B32B 2475/00; Y10T 428/24
See application file for complete search history.

(56) References Cited

U.S. PATENT DOCUMENTS

| | | |
|---|---|---|
| 2008/0220224 A1 | 9/2008 | Tokumoto et al. |
| 2010/0173132 A1* | 7/2010 | Furukawa ................ B32B 7/02 428/172 |
| 2016/0200082 A1 | 7/2016 | Awa et al. |

FOREIGN PATENT DOCUMENTS

| | | | |
|---|---|---|---|
| JP | 2001-253014 A | | 9/2001 |
| JP | 2003-266611 A | | 9/2003 |
| JP | 2003266611 A | * | 9/2003 |
| JP | 2006-002518 A | | 1/2006 |
| JP | 2006-274508 A | | 10/2006 |
| JP | 2007-111928 A | | 5/2007 |
| JP | 2008-247020 A | | 10/2008 |
| JP | 2010-194903 A | | 9/2010 |
| JP | 2010194903 A | * | 9/2010 |
| JP | 2014-148170 A | | 8/2014 |
| WO | WO-2008/038703 A1 | | 4/2008 |
| WO | WO-2008/129667 A1 | | 10/2008 |

OTHER PUBLICATIONS

[NPL-2] Omichi (JP 2010-194903 A); (EPO machine translation to English). (Year: 2010).*

International Searching Authority, "International Search Report," issued in connection with International Patent Application No. PCT/JP2017/040627, dated Feb. 6, 2018.

International Searching Authority, "Written Opinion," issued in connection with International Patent Application No. PCT/JP2017/040627, dated Feb. 6, 2018.

Extended European Search Report dated Nov. 4, 2019 for corresponding Application No. 17871303.8.

* cited by examiner

DECORATIVE SHEET AND DECORATIVE PLATE

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2017/040627, filed on Nov. 10, 2017, which is based upon and claims the benefit of priority to Japanese Patent Application No. 2016-222560, filed on Nov. 15, 2016; the disclosures of which are all incorporated herein by reference in their entireties.

TECHNICAL FIELD

The present invention relates to a decorative sheet and decorative plate for furniture, general interior materials, etc.

BACKGROUND ART

PTL 1 discloses an example of a conventional decorative sheet for furniture, general interior materials, etc. In the decorative sheet according to PTL 1, a surface protective layer provided on a substrate and forming the outermost surface of the decorative sheet contains an anti-contamination agent containing silicone oil in an oily resin or a matrix resin formed by curing an ionizing radiation-curable monomer. This ensures that the lower limit of the coefficient of kinetic friction is 0.1 for the outermost surface of the decorative sheet.

CITATION LIST

[Patent Literature] [PTL 1] JP 2008-247020 A

SUMMARY OF THE INVENTION

Technical Problem

The decorative sheet disclosed in PTL 1, however, presents a problem that a decorative plate produced by laminating the decorative sheet may slip when loaded onto a vehicle or other objects, which may cause stacked decorative plates to collapse because the lower limit of the coefficient of kinetic friction is excessively low.

The present invention has been made in view of the above circumstances, and aims to provide a decorative plate and decorative sheet that makes the decorative plate more slip-resistant.

Proposed Solution to Problem

To improve or even solve the above problem, one aspect of the invention is a decorative sheet having a substrate and a surface protective layer formed on the substrate. The surface protective layer contains a curable resin and at least one of resin beads and an inorganic compound filler, and has a surface kinetic friction coefficient of 0.11 or more to 0.30 or less.

In addition, to solve the above problems, an aspect of the invention is a decorative plate having a decorative sheet laminated on a base.

Desired Advantageous Effects of the Invention

An aspect of the present invention makes it possible to provide a decorative plate and a decorative sheet that makes the decorative plate more slip-resistant.

DESCRIPTION OF THE REPRESENTATIVE EMBODIMENTS

Figure 1:
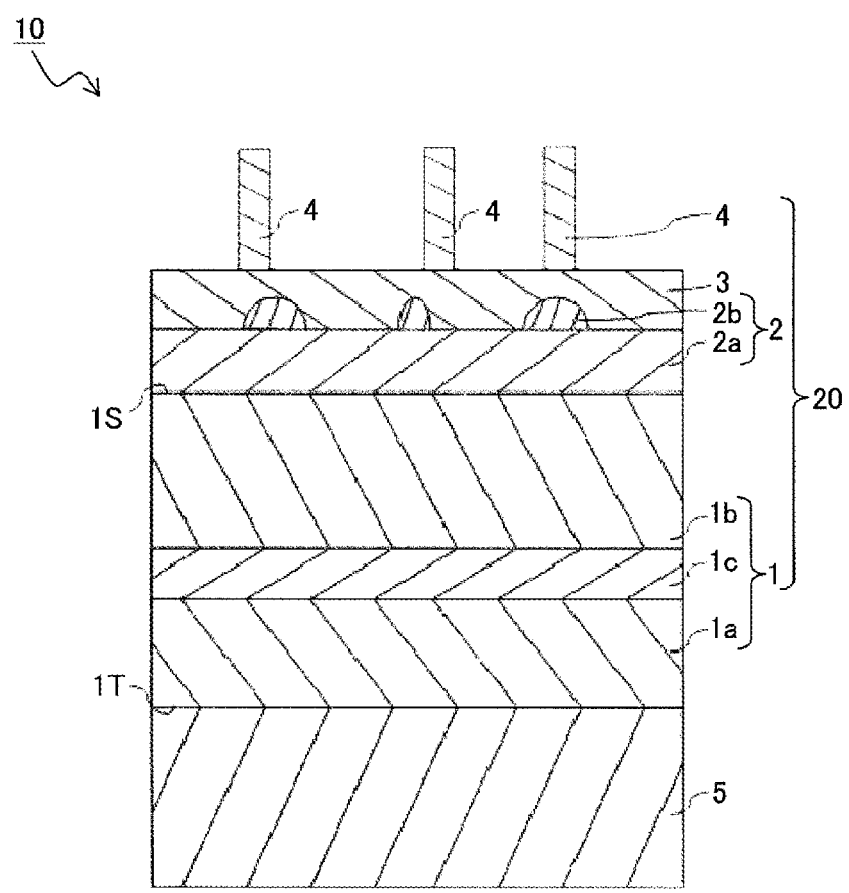
FIG. 1 is a cross-sectional view illustrating the structure of a decorative sheet and decorative plate, according to a first embodiment of the present invention.

With reference to the drawings, a description will now be given of representative embodiments according to the present invention. The present invention is not limited to the following representative embodiments, and appropriate modifications can be made without departing from the spirit of the present invention. The representative embodiments described below are merely examples of the present invention, and the design thereof could be appropriately changed by one skilled in the art. The same constituent elements are denoted by the same reference numerals unless there is a reason for the sake of convenience, and redundant description is omitted. In the drawings referred to in the following description, for clarity, characteristic parts are enlarged, and thus the components are not shown to scale. It is, however, clear that one or more embodiments can be implemented without such details. In addition, known structures and devices may be schematically represented for simplicity.

First Embodiment

A first embodiment of the present invention will now be described with reference to the drawings.

(Decorative Plate)

The structure of a decorative plate 10 will be described with reference to FIG. 1.

As shown in FIG. 1, the decorative plate 10 includes a decorative sheet 20 and a base 5. The decorative sheet 20 is laminated on top of the base 5. Note that "top of the base 5" refers to an upper surface of the base 5 in FIG. 1.

The decorative plate 10 is suitable for interior fittings such as a large sliding door.

(Decorative Sheet)

The structure of a decorative sheet 20 will be described with reference to FIG. 1.

As shown in FIG. 1, the decorative sheet 20 includes a substrate 1, a pattern layer 2, a first surface protective layer 3, and a second surface protective layer 4, which are laminated in this order from a side closer to the base 5.

(Substrate)

The substrate 1 is a sheet layer that is moisture-proof (resists penetration by water vapor).

The first embodiment describes a case in which the substrate 1 is formed of moisture-proof paper including a first paper substrate 1a, a second paper substrate 1b, and a moisture-proof resin layer 1c.

The first paper substrate 1a forms a part of the substrate 1 on a side facing the base 5.

Therefor one surface of the first paper substrate 1a (a lower surface of the first paper substrate 1a in FIG. 1) forms a rear surface 1T, which is a surface of the substrate 1 facing the base 5.

In addition, the first paper substrate 1a is formed of, for example, reinforced paper containing a resin between cellulose fibers.

The reinforced paper preferably contains, for example, cellulose fibers at least 50 wt % and less than 100 wt %. In addition, the reinforced paper has a thickness of, for example, 15 μm or more and 60 μm or less.

The first paper substrate 1a has a basis weight of, for example, 23 g/m$^2$.

The second paper substrate 1b forms a part of the substrate 1 on a side facing the pattern layer 2.

Therefor one surface of the second paper substrate 1b (an upper surface of the second paper substrate 1b in FIG. 1) forms a rear surface 1S, which is a surface of the substrate 1 facing the pattern layer 2.

As with the first paper substrate 1a, the second paper substrate 1b is formed of, for example, reinforced paper containing a resin between cellulose fibers.

The second paper substrate 1b has a basis weight of, for example, 30 g/m$^2$.

The moisture-proof resin layer 1c is disposed between the first paper substrate 1a and the second paper substrate 1b. The substrate 1 thus includes two paper substrates (first paper substrate 1a and second paper substrate 2b) and the moisture-proof resin layer 1c between the two paper substrates.

The moisture-proof resin layer 1c is formed of a moisture-proof resin that is impervious to water vapor.

A suitable moisture-proof resin includes, for example, an olefin resin or other thermoplastic resin whose melting point is 100° C. or more and 200° C. or less.

The moisture-proof resin layer 1c has a thickness of, for example, 20 μm or more and 70 μm or less.

In the first embodiment, the substrate 1 is formed of moisture-proof paper that is impervious to water vapor, as described above.

This makes it hard for water vapor to penetrate from a front side of the decorative sheet 20 to its rear side, or from the second surface protective layer 4 to the base 5, in turn preventing the base 5 from deforming due to the water vapor (moisture).

Thus, with a large sliding door formed of the decorative plate 10, the sliding door is prevented from deforming due to water vapor (moisture), and in turn from failing to open or close due to the deformation.

In addition, the moisture-proof paper, which forms the substrate 1a, includes the first paper substrate 1a, the second paper substrate 1b, and the moisture-proof resin layer 1c, so that the substrate 1 can be thick and stiff.

As a result, the decorative sheet 20 is more wrinkle-resistant and is better prevented from curling. The decorative sheet 20 can thus be laminated relatively easily to the base 5.

The substrate 1 is formed of moisture-proof paper in the first embodiment, but another configuration is also possible. For example, the substrate 1 may be formed of a moisture-proof resin film.

(Pattern Layer)

The pattern layer 2 is laminated on top of the substrate 1. Note that "top of the substrate 1" refers to an upper surface of the substrate 1 in FIG. 1. In other words, the pattern layer 2 is laminated on the second paper substrate 1b.

In addition, the pattern layer 2 is a layer on which a pattern may be printed to improve the design. In other words, the pattern layer 2 is a pattern-printed layer formed between the substrate 1 and the surface protective layer (first surface protective layer 3 and second surface protective layer 4).

Any of isoindolinone yellow, polyazo red, phthalocyanine blue, carbon black, iron oxide, and titanium oxide, for example, or a mixture thereof may be used as a pigment of a printing ink to form the pattern layer 2. Ethyl acetate, n-butyl acetate, isobutanol or methyl isobutyl ketone, for example, may be used as a solvent of a printing ink to form the pattern layer 2.

Any pattern, such as a wood grain, cork, pebble grain, tile, pottery, or abstract pattern, is possible as long as it is suitable for an object onto which to apply the decorative sheet 20.

The pattern layer 2 includes a patterned ink layer 2a and a grain-like ink layer 2b, which are laminated in this order.

The patterned ink layer 2a is formed on the surface 1S of the substrate 1, and entirely covers the surface 1S to serve as an underlying color of the pattern.

The grain-like ink layer 2b renders a pattern other than the underlying color.

(First Surface Protective Layer)

A first surface protective layer 3 is a sheet layer that is formed on top of the pattern layer 2 and entirely covers the pattern layer 2. Note that "top of the pattern layer 2" refers to an upper surface of the pattern layer 2 in FIG. 1.

In addition, the first surface protective layer 3 is formed of a material (resin) that is transparent or translucent enough to allow a pattern of the pattern layer 2 to be seen through the first surface protective layer 3.

The first surface protective layer 3 is preferably formed of, for example, a thermosetting resin.

Considering adhesiveness to a second surface protective layer 4, a deformation-following property and scratch resistance of the decorative sheet 20, and other factors, a thermosetting resin (binder resin) containing urethane bonds, such as a two-part curable urethane resin, is preferable.

The first embodiment describes a case in which the first surface protective layer 3 contains a curable resin (thermosetting resin). The first embodiment also describes a case in which the first surface protective layer 3 contains a thermosetting resin containing urethane bonds.

In addition, the first embodiment describes a case in which the first surface protective layer 3 has a surface kinetic friction coefficient of 0.11 or more and 0.30 or less.

No matting agent such as silica particles is added to the thermosetting resin. Ethyl acetate and n-butyl acetate are both suitable as a solvent of the thermosetting resin.

The two-part curable urethane resin is, for example, a urethane resin composed mainly of a polyol and of an isocyanate as a crosslinking agent (curing agent).

A suitable polyol has two or more hydroxyl groups per molecule. Examples of suitable polyols therefore include a polyethylene glycol, a polypropylene glycol, an acrylic polyol, a polyester polyol, a polyether polyol, a polycarbonate polyol, and a polyurethane polyol.

A suitable isocyanate is a polyvalent isocyanate having two or more isocyanate groups per molecule. Examples of suitable isocyanates therefore include an aromatic isocyanate and an aliphatic or alicyclic isocyanate.

Examples of suitable aromatic isocyanates include a 2,4-tolylene diisocyanate, a xylene diisocyanate, and a 4,4'-diphenylmethane diisocyanate. Examples of suitable aliphatic or alicyclic isocyanates include a 1,6-hexamethylene diisocyanate, an isophorone diisocyanate, a hydrogenated tolylene diisocyanate, and a hydrogenated diphenylmethane diisocyanate.

Another example of the two-part curable urethane resin is an adduct or polymer of various isocyanates. For example, an adduct of a tolylene diisocyanate and a tolylene diisocyanate trimer may be used. Out of the above isocyanates, the aliphatic or alicyclic isocyanates are preferable in offering a good weather resistance and a thermal yellowing resistance; for example, a 1,6-hexamethylene diisocyanate can be used.

As described above, the first surface protective layer 3 contains a urethane-bonding thermosetting resin, that is, a hard resin. Thus, the first surface protective layer 3, which is exposed, makes the decorative sheet 20 more scratch-resistant.

(Second Surface Protective Layer)

A second surface protective layer 4 is partially formed on the first surface protective layer 3 and covers part of the first surface protective layer 3 (e.g., a part of the first surface protective layer 3 facing the grain-like ink layer 2b in a thickness direction of the first surface protective layer 3). In other words, the second surface protective layer 4 may be formed on top of the first surface protective layer 3 so as to overlap or not to overlap with the grain-like ink layer 2b in plan view. Note that "top of the first surface protective layer 3" refers to an upper surface of the first surface protective layer 3 in FIG. 1. This means that the second surface protective layer 4 is formed on a part of the first surface protective layer 3.

As shown in FIG. 1, the second surface protective layer 4 forms a part protruding from the surface of the first surface protective layer 3. The second surface protective layer 4 formed on a part facing the grain-like ink layer 2b in the thickness direction of the first surface protective layer 3 thus makes it possible to render a wood grain in a visual and tactile manner.

The second surface protective layer 4 covers, for example, a 0.1% or more area of the first surface protective layer 3. The second surface protective layer 4 can cover, for example, a 30% or less area of the first surface protective layer 3.

As described above, the first surface protective layer 3 is formed of a highly scratch-resistant and stain-resistant material. Therefor the decorative sheet 20 has a highly scratch-resistant and stain-resistant configuration even if the surface area of the second surface protective layer 4 is small.

In addition, the second surface protective layer 4 is formed of a material (resin) that is transparent or translucent enough to allow a pattern of the pattern layer 2 to be seen through the second surface protective layer 4 and the first surface protective layer 3.

The second surface protective layer 4 is preferably formed of, for example, a thermosetting resin.

Considering adhesiveness to the first surface protective layer 3, a preferable thermosetting resin is, for example, a mixture created by adding at least one of a matting agent such as silica particles, which are inorganic compound fillers, and synthetic resin beads (resin bead) to a thermosetting resin (binder resin) containing urethane bonds, such as a two-part curable urethane resin.

In the first embodiment, the second surface protective layer 4 is formed of a urethane-bonding thermosetting resin with silica particles, as a matting agent, and synthetic resin beads being added thereto. The first surface protective layer 3 is thus made glossier than the second surface protective layer 4. However, the first surface protective layer 3 does not necessarily have to be glossier than the second surface protective layer 4. A first surface protective layer 3 with, for example, a 30 or higher degree of gloss has an effect similar to a first surface protective layer 3 that is glossier than the second surface protective layer 4 even if the first surface protective layer 3 is less glossy than the second surface protective layer 4. The glossiness may be visually determined in the present embodiment, but may be determined with a gloss meter (product name: Micro-gloss) manufactured by BYK-Gardner or a gloss meter manufactured by HORIBA, Ltd.

Hence in the first embodiment, the second surface protective layer 4 is formed of a urethane-bonding thermosetting resin, that is, a resin that is not affected by the gloss of the lower layer (first surface protective layer 3). This makes it possible for the first surface protective layer 3 and the second surface protective layer 4 to appropriately create a visual stereoscopic effect. In addition, the urethane-bonding thermosetting resin is hard, which in turn makes the decorative sheet 20 more scratch-resistant.

As described above, no matting agent is added to the first surface protective layer 3. Hence the second surface protective layer 4, to which a matting agent (silica particles) is added, is less light-reflective and therefore less glossy (less lustrous) than the first surface protective layer 3. The first surface protective layer 3 and the second surface protective layer 4 thus provide the surface of the decorative sheet 20 with different degrees of gloss, and in turn create a visual stereoscopic effect by means of optical illusion.

The thermosetting resin preferably contains silica particles at least 5 wt % of a total mass thereof. This sufficiently reduces the gloss of the second surface protective layer 4 relative to that of the first surface protective layer 3, and in turn increases the gloss difference between the second surface protective layer 4 and the first surface protective layer 3. As a result, an appropriate stereoscopic effect is created even if the surface area of the second surface protective layer 4 is small relative to the entire area of the first surface protective layer 3. Note that the silica particles should weigh 35 wt % or less relative to the total mass of the thermosetting resin.

The first embodiment describes a case in which the second surface protective layer 4 contains silica particles at 5 wt % or more and 35 wt % or less.

The first embodiment also describes a case in which the second surface protective layer 4 contains a urethane-bonding thermosetting resin and silica particles.

In the first embodiment, the first surface protective layer 3 is glossier (more lustrous) than the second surface protective layer 4. This means that the surface of the first surface protective layer 3 is smoother and therefore fingerprint-resistant, so that the decorative sheet 20 will be more stain-resistant. The stain resistance can be improved even if only a small amount of the first surface protective layer 3 is applied. In addition, a painting pattern popular in the United States and other countries, such as a woodgrain pattern, can be rendered. Furthermore, a more delicate and transparent design pattern can be rendered because the first surface protective layer 3 has less white turbidity.

The synthetic resin beads may be highly transparent urethane resin beads. In this case, the second surface protective layer 4 is more transparent, thus making a pattern of the pattern layer 2, which imparts a design, more visible. The synthetic resin beads should be at least 30 μm in diameter on average. Although, in the present embodiment, there is no upper limit on the average diameter of the added synthetic resin beads, it is preferably 120 μm or less in consideration of a film thickness.

The first embodiment describes a case in which the second surface protective layer 4 contains urethane resin beads.

The first embodiment describes a case in which the second surface protective layer 4 contains the urethane resin beads at 20 wt % or more and 25 wt % or less relative to a 100-wt % thermosetting resin (binder resin).

The surface of the second surface protective layer 4 is formed with a maximum height Rmax value being at least 30 μm as measured with a contact-type roughness meter. This means that the surface of the second surface protective layer 4 has an at least 30 μm maximum height as measured with a contact-type roughness meter. This creates more appropriate tactile feeling matching the stereoscopic effect. Although, in the present embodiment, there is no upper limit on the maximum height measured with the contact type roughness meter, the maximum height Rmax value of the second surface protective layer 4 measured with the contact-type roughness meter is preferably 120 μm or less in terms of, for example, a size of the urethane resin beads to be added.

Although a thermosetting resin is used as the binder resin in the first embodiment, another resin may also serve as the binder resin. For example, an ionizing radiation curable resin may be used. In this case, an ultraviolet curable resin is a suitable example. Examples of suitable ultraviolet curable resins include a (meth)acrylic resin, a silicone resin, a polyester resin, a urethane resin, an amide resin, and an epoxy resin. These resins make the second surface protective layer 4 (i.e., the outermost surface layer of the decorative sheet 20) harder, and in turn improve physical properties, such as an abrasion resistance, scratch resistance, and solvent resistance of the surface of the decorative sheet 20. In addition, for example, a mixture of a thermosetting resin and an ionizing radiation curable resin may be used as the binder resin.

In the first embodiment, synthetic resin beads are added to the thermosetting resin, but another configuration may be used. For example, an inorganic compound filler may be added to the thermosetting resin.

The second surface protective layer 4 may have any shape; it may assume a regular shape such as circle, square, hexagon, or assume a irregular patterned shape. The second surface protective layer 4 may also align with a pattern of the pattern layer 2, such as the grain-like ink layer 2b, in which case the pattern appears more realistic.

As described above, the surface protective layer (first surface protective layer 3 and second surface protective layer 4) contains a curable resin and at least one of resin beads and an inorganic compound filler, and has a surface kinetic friction coefficient of 0.11 or more and 0.30 or less.

(Base)

A base 5 is a plate-like member formed of a metal or wood material.

Examples of the metal material include aluminum, steel, stainless steel, and a composite panel. Examples of the composite panel include a panel including a resin layer that serves as a core material and a metal plate (aluminum, galvalume, stainless steel, etc.) attached to both sides of the resin layer.

Examples of the wood material include MDF (medium density fiberboard), plywood, and particleboard.

Note that the first embodiment is merely an example of the present invention and the present invention is not limited to the first embodiment, but various modifications can be made to the first embodiment of the present invention without departing from a technical concept of the present invention.

Advantageous Effects of the First Embodiment

As described above, the decorative sheet 20 of the first embodiment achieves the following effects.

(1) The surface protective layer formed on the substrate 1 contains a curable resin and at least one of resin beads and an inorganic compound filler, and has a surface kinetic friction coefficient of 0.11 or more and 0.30 or less.

This allows the kinetic friction coefficient of the decorative sheet 20 to make the decorative plate 10 more slip-resistant, thus providing a decorative sheet 20 that makes the decorative plate 10 more slip-resistant.

(2) The first surface protective layer 3 contains a curable resin, and has a surface kinetic friction coefficient of 0.11 or more and 0.30 or less. In addition, the second surface protective layer 4 contains at least one of resin beads and an inorganic compound filler. The first surface protective layer 3 is glossier than the second surface protective layer 4.

The first surface protective layer 3 and the second surface protective layer 4 thus provide the surface of the decorative sheet 20 with different degrees of gloss, and in turn create a visual stereoscopic effect by means of optical illusion.

(3) The second surface protective layer 4 contains silica particles at 5 wt % or more and 35 wt % or less.

The 5 wt % or more silica particles sufficiently reduce the gloss of the second surface protective layer 4, and in turn produce a large gloss difference between the second surface protective layer 4 and the first surface protective layer 3. As a result, an appropriate stereoscopic effect is created even if the surface area of the second surface protective layer 4 is small.

(4) The surface of the second surface protective layer 4 has a maximum height of 30 μm or more and 120 μm or less as measured with a contact-type roughness meter.

This creates more appropriate tactile feeling matching the stereoscopic effect.

(5) The first surface protective layer 3 contains a urethane-bonding thermosetting resin.

This provides better adhesiveness of the first surface protective layer 3 to other layers, such as the pattern layer 2 and the second surface protective layer 4, and also provide a better deformation-following property and scratch resistance for the decorative sheet 20.

(6) The second surface protective layer 4 contains a urethane-bonding thermosetting resin, and silica particles.

This provides better adhesiveness to a layer adjacent to the second surface protective layer 4, such as the first surface protective layer 3, and also provide a better deformation-following property and scratch resistance for the decorative sheet 20.

(7) The second surface protective layer 4 contains the urethane resin beads at 20 wt % or more and 25 wt % or less relative to a 100 wt % thermosetting resin.

This allows the surface kinetic friction coefficient of the second surface protective layer 4 to reduce the risk of stacked decorative plates 10 each formed by laminating a decorative sheet 20 collapsing.

(8) The surface protective layers contain urethane resin beads.

The urethane resin beads make the second surface protective layer 4 more transparent, and in turn make a pattern of the pattern layer 2, which imparts a design, more visible through the second surface protective layer 4.

(9) The substrate 1 includes the first paper substrate 1a, the second paper substrate 1b, and the moisture-proof resin layer 1c, which is disposed between the two paper substrates.

This configuration makes the substrate 1 thick and stiff, so that the decorative sheet 20 is more wrinkle-resistant and is better prevented from curling. This facilitates lamination of the decorative sheet 20 to the base 5.

(10) The decorative sheet 20 includes a pattern layer 2, which is formed between the substrate 1 and the surface protective layer and has a pattern printed thereon.

Thus a pattern can be added onto the decorative sheet 20.

In addition, the decorative plate 10 of the first embodiment achieves the following effects, as described above.

(11) The decorative plate 10 is formed of the decorative sheet 20 laminated on the base 5.

This allows the kinetic friction coefficient of the decorative plate 10 with the decorative sheet 20 to make the decorative sheet 10 more slip-resistant, thus providing a more slip-resistant decorative plate 10.

Modified Example (1) In the first embodiment, the difference in gloss and height between the first surface protective layer 3 and the second surface protective layer 4 creates a tactile and visual stereoscopic effect, but other configurations are also possible.

Figure 2:
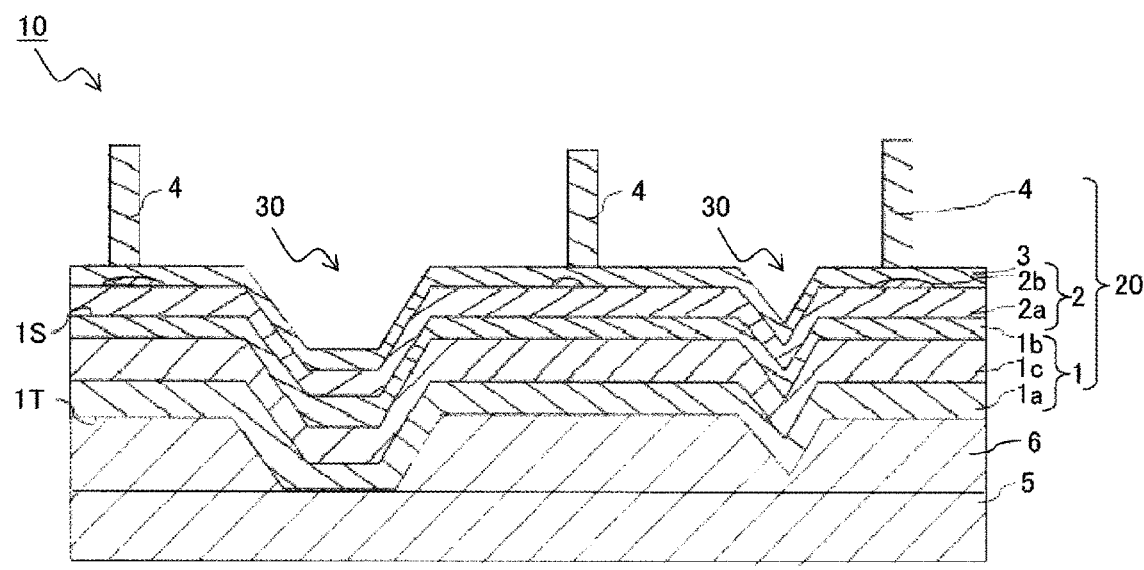
FIG. 2 shows a modified example of the first embodiment of the present invention.

For example, as shown in FIG. 2, an embossed pattern 30 may be formed on the decorative sheet 20 to create a larger tactile stereoscopic effect. Accordingly, in the decorative sheet 20 of the modified example, embossing is applied to the surface of the surface protective layer (first surface protective layer 3, second surface protective layer 4) opposite to the surface opposed to substrate 1. Note that the embossed pattern 30 may be formed between the second surface protective layers 4. In addition, the embossed pattern 30 may reach the rear surface 1T of the substrate 1.

In this case, the decorative sheet 20 may be embossed by passing it between an embossing roll having concavities that are at least 15 μm deep and a rubber back roll that has a hardness of 50 degrees or more and 90 degrees or less. The hardness can be measured according to, for example, JIS K-6301 A. The base 5 is then adhered via an adhesive layer 6 to the decorative sheet 20 having the embossed pattern 30 to form the decorative plate 10.

(2) In the first embodiment, the second surface protective layer 4 contains urethane resin beads at 20 wt % or more and 25 wt % or less relative to a 100 wt % thermosetting resin (binder resin), but this is not limiting.

For example, the second surface protective layer 4 may contain urethane resin beads at 10 wt % or more and 35 wt % or less relative to the 100 wt % thermosetting resin (binder resin).

EXAMPLES

The decorative sheets of Examples 1 and 2 and the decorative sheets of Comparative Examples 1 and 2 will now be described in accordance with the following examples with reference to FIG. 1 of the first embodiment.

Example 1

The decorative sheet of Example 1 is configured as follows.

The substrate 1 is formed of thin paper having a 29 g/m2 basis weight.

The surface protective layer (first surface protective layer 3 and second surface protective layer 4) contains urethane resin beads.

Example 2

The decorative sheet of Example 2 is configured similarly to the decorative sheet of Example 1 except that the substrate 1 is formed of thin paper having a 50 g/m2 basis weight.

Comparative Example 1

The decorative sheet of Comparative Example 1 is configured similarly to the decorative sheet of Example 1 except that the surface protective layer contains acrylic resin beads.

Comparative Example 2

The decorative sheet of Comparative Example 2 is configured similarly to the decorative sheet of Comparative Example 1 except that the substrate 1 is formed of thin paper having a 50 g/m2 basis weight.

(Performance Evaluation)

The decorative sheets 20 of Examples 1 and 2 and the decorative sheets 20 of Comparative Examples 1 and 2 were respectively subjected to a performance evaluation (abrasion resistance, scratch resistance, solvent resistance, kinetic friction coefficient, peeling resistance, water resistance, stain resistance, and appearance) in the following method. The evaluation results are shown in Table 1.

TABLE 1

| Items | | Example 1 | Example 2 | Comparative Example 1 | Comparative Example 2 |
|---|---|---|---|---|---|
| Abrasion resistance | | >250 rotations | >250 rotations | >250 rotations | >250 rotations |
| Scratch resistance | | 200 g | 200 g | 200 g | 200 g |
| Solvent resistance | | >50 rotations | >50 rotations | >50 rotations | >50 rotations |
| Kinetic friction coefficient | | 0.207 | 0.243 | 0.102 | 0.109 |
| Peeling resistance | Room temp. for 10 days | Unpeeled | Unpeeled | Unpeeled | Unpeeled |
| | 60° C. for 2 days | Unpeeled | Unpeeled | Unpeeled | Unpeeled |
| Water resistance | Boiling water for 1 h | Unchanged | Unchanged | Unchanged | Unchanged |
| | Distilled water for 4 h | Unchanged | Unchanged | Unchanged | Unchanged |
| Stain resistance | Salad oil | Unchanged | Unchanged | Unchanged | Unchanged |
| | Coffee | Unchanged | Unchanged | Unchanged | Unchanged |
| | Tea | Unchanged | Unchanged | Unchanged | Unchanged |
| | Tomato ketchup | Unchanged | Unchanged | Unchanged | Unchanged |
| | Mustard | Unchanged | Unchanged | Unchanged | Unchanged |
| Appearance evaluation | | Passed | Passed | Passed | Passed |

TABLE 1-continued

| Items | Example 1 | Example 2 | Comparative Example 1 | Comparative Example 2 |
|---|---|---|---|---|
| Overall evaluation | Passed | Passed | Failed (Kinetic friction coefficient) | Failed (Kinetic friction coefficient) |

(Abrasion Resistance)

The abrasion resistance was evaluated by an abrasion C test.

The abrasion C test was carried out with a 500-g load at 250 rotations.

(Scratch resistance) The scratch resistance was evaluated with a Hoffman Scratch Hardness Tester (manufactured by BYK-Gardner).

(Solvent resistance) The solvent resistance was evaluated by 50 rounds of MEK (methyl ethyl ketone) reciprocating rubbing tests.

(Kinetic friction coefficient) A coefficient of kinetic friction (COF) was evaluated by a slip test.

The slip test was carried out under the following conditions: Plate: a 12-mm thick particleboard. Paper (unit): a decorative sheet of paper. Surface protective layer: 100-g/m² two-part vinyl acetate resin emulsion adhesive that has been pressure-laminated at 50 N/cm² for 24 hours. Speed: 20 mm/s (compliant with JIS P8147:2010)

(Peeling resistance) The peeling resistance was evaluated after attaching a cellophane tape to each decorative sheet 20 and leaving them at room temperature for 10 days before peeling the tape and after attaching a cellophane tape to each decorative sheet 20 and leaving them at 60° C. for two days before peeling the tape.

(Water resistance) The water resistance was evaluated by a one-hour test with boiling water and a four-hour test with distilled water.

(Stain resistance) The stain resistance was evaluated in compliance with a test method for high-pressure decorative laminates made of thermosetting resin according to JIS K 6902_2008. High-pressure decorative plate tests were respectively carried out for four hours with salad oil (produced by J-Oil Mills, Inc.), coffee (2-g instant coffee dissolved in 180-ml tap water), tea (prepared by immersing a tea bag in 120-ml boiling water for two minutes), tomato ketchup (produced by Kagome Co., Ltd.), and mustard (sold by S&B Foods Inc.).

(Appearance) The appearance was evaluated by a sensory analysis on the external design of each decorative sheet 20.

(Overall evaluation) As shown in Table 1, the evaluation results confirm that the decorative sheets 20 of Examples 1 and 2 each have a kinetic friction coefficient that is larger by at least 0.125 than the decorative sheets 20 of Comparative Examples 1 and 2.

(Slipperiness) The decorative sheet 20 of each example and comparative example was attached to the base 5 to prepare the decorative plate 10 of each example and comparative example. The prepared decorative plates 10 each measure one meter on one side and two meters on the other side (a common size for a sliding door) and weigh approximately one kilogram. A stack of 10 decorative sheets 20 of each example and comparative example were loaded on a vehicle or the like.

The results were that each decorative plate 10 of Examples 1 and 2 did not slip when the vehicle or the like loaded therewith moved, nor did the stacked decorative plates 10 collapse. On the other hand, each decorative plate 10 of Comparative Examples 1 and 2 slipped when loaded on the vehicle or the like, and the stacked decorative plates 10 collapsed.

In addition, a stack of ten decorative plates 10 of each example and a stack of ten decorative plates 10 of each comparative example were inclined by 45° relative to the horizontal direction. The results were that each decorative plate 10 of Examples 1 and 2 did not slip even at the 45° inclination, nor did the stacked decorative plates 10 collapse. On the other hand, each decorative plate 10 of Comparative Examples 1 and 2 slipped, and the stacked decorative plates 10 collapsed.

These results clarify that the decorative sheets 20 of Examples 1 and 2 are more capable of making decorative plates formed by laminating decorative sheets slip-resistant than the decorative sheets 20 of Comparative Examples 1 and 2.

REFERENCE SIGNS LIST

1 . . . Substrate; 1a . . . First paper substrate; 1b . . . Second paper substrate; 1c . . . Moisture-proof resin layer; 2 . . . Pattern layer; 2a . . . Patterned ink layer; 2b . . . Grain-like ink layer; 3 . . . First surface protective layer; 4 . . . Second surface protective layer; 5 . . . Base; 6 . . . Adhesive layer; 10 . . . Decorative plate; 20 . . . Decorative sheet; 30 . . . Embossed pattern.

What is claimed is:

1. A decorative sheet comprising:
a substrate; and
a surface protective layer formed on the substrate, wherein the surface protective layer comprises:
a first surface protective layer formed on the substrate; and
a second surface protective layer formed on part of the first surface protective layer,
the first surface protective layer contains a curable resin and has a surface kinetic friction coefficient of 0.11 or more and 0.30 or less,
the second surface protective layer contains at least one of resin beads and an inorganic compound filler, which is silica particles, a content of the silica particles in the second surface protective layer is at 5 wt % or more and 35 wt % or less, and
the first surface protective layer is glossier than the second surface protective layer.

2. The decorative sheet of claim 1, wherein the second surface protective layer has a maximum height measured by a contact-type roughness meter in a range of 30 μm or more and 120 μm or less.

3. The decorative sheet of claim 1, wherein the curable resin of the first surface protective layer contains a urethane-bonding thermosetting resin.

4. The decorative sheet of claim 1, wherein the second surface protective layer further contains a urethane-bonding thermosetting resin.

5. The decorative sheet of claim 1, wherein the resin beads are urethane resin beads and wherein the second surface protective layer further contains a binder resin, and the second surface protective layer contains the urethane resin beads at 10 wt % or more and 35 wt % or less relative to 100 wt % of the binder resin.

6. The decorative sheet of claim 5, wherein the second surface protective layer contains the urethane resin beads at 20 wt % or more and 25 wt % or less relative to 100 wt % of the binder resin.

7. The decorative sheet of claim 1, wherein the resin beads are urethane resin beads.

8. The decorative sheet of claim 1, wherein the substrate comprises:

two paper substrates; and a moisture-proof resin layer disposed between the two paper substrates.

9. The decorative sheet of claim 1, wherein a surface of the surface protective layer on a side opposite to that facing the substrate is embossed.

10. The decorative sheet of claim 1, further comprising a pattern layer formed between the substrate and the surface protective layer and having a pattern printed on the pattern layer.

11. A decorative plate formed by laminating the decorative sheet of claim 1 on a base.

12. A decorative sheet comprising:

a substrate; and a surface protective layer formed on the substrate, wherein the surface protective layer comprises:

a first surface protective layer formed on the substrate; and a second surface protective layer formed on part of the first surface protective layer, the first surface protective layer contains a curable resin and has a surface kinetic friction coefficient of 0.11 or more and 0.30 or less, the second surface protective layer contains at least one of resin beads and an inorganic compound filler, the first surface protective layer is glossier than the second surface protective layer and the second surface protective layer has a maximum height measured by a contact-type roughness meter in a range of 30 μm or more and 120 μm or less.

13. The decorative sheet of claim 12, wherein the curable resin of the first surface protective layer contains a urethane-bonding thermosetting resin.

14. The decorative sheet of claim 12, wherein the inorganic filler is silica particles and the second surface protective layer further contains a urethane-bonding thermosetting resin.

15. The decorative sheet of claim 12, wherein the resin beads are urethane resin beads and wherein the second surface protective layer further contains a binder resin, and the second surface protective layer contains the urethane resin beads at 10 wt % or more and 35 wt % or less relative to 100 wt % of the binder resin.

16. The decorative sheet of claim 15, wherein the second surface protective layer contains the urethane resin beads at 20 wt % or more and 25 wt % or less relative to 100 wt % of the binder resin.

17. The decorative sheet of claim 12, wherein the resin beads are urethane resin beads.

18. The decorative sheet of claim 12, wherein a surface of the surface protective layer on a side opposite to that facing the substrate is embossed.

19. A decorative plate formed by laminating the decorative sheet of claim 12 on a base.

20. A decorative sheet comprising:

a substrate; and a surface protective layer formed on the substrate, wherein the surface protective layer comprises:

a first surface protective layer formed on the substrate; and a second surface protective layer formed on part of the first surface protective layer, the first surface protective layer contains a curable resin and has a surface kinetic friction coefficient of 0.11 or more and 0.30 or less, the second surface protective layer contains urethane resin beads, a binder resin and an inorganic compound filler, the first surface protective layer is glossier than the second surface protective layer and the second surface protective layer contains the urethane resin beads at 10 wt % or more and 35 wt % or less relative to 100 wt % of the binder resin.

21. The decorative sheet of claim 20, wherein the second surface protective layer contains the urethane resin beads at 20 wt % or more and 25 wt % or less relative to 100 wt % of the binder resin.

* * * * *